United States Patent [19]
Petersen et al.

[11] Patent Number: 5,062,302
[45] Date of Patent: Nov. 5, 1991

[54] LAMINATED SEMICONDUCTOR SENSOR WITH OVERPRESSURE PROTECTION

[75] Inventors: Kurt E. Petersen, San Jose; Phillip W. Barth, Palo Alto; Janusz Bryzek; Joseph R. Mallon, Jr., both of Fremont, all of Calif.

[73] Assignee: Schlumberger Industries, Inc., Norcross, Ga.

[21] Appl. No.: 574,387

[22] Filed: Aug. 27, 1990

Related U.S. Application Data

[63] Continuation of Ser. No. 187,739, Apr. 29, 1988, abandoned.

[51] Int. Cl.[5] ............................................. G01L 9/00
[52] U.S. Cl. ...................................... 73/754; 73/721; 73/DIG. 4; 338/4
[58] Field of Search ................. 73/715, 716, 718, 719, 73/721, 754, 706, DIG. 4, 727, 720; 338/4, 42

[56] References Cited

U.S. PATENT DOCUMENTS

| | | |
|---|---|---|
| 3,618,390 | 11/1971 | Frick . |
| 3,793,885 | 2/1974 | Frick . |
| 3,800,413 | 4/1974 | Frick . |
| 3,970,982 | 7/1976 | Kurtz et al. . |
| 4,040,172 | 8/1977 | Kurtz et al. . |
| 4,051,451 | 9/1977 | Kurtz et al. . |
| 4,063,209 | 12/1977 | Kurtz et al. . |
| 4,084,438 | 4/1978 | Lee et al. ............................... 73/716 |
| 4,158,217 | 6/1979 | Bell ........................................ 73/718 |
| 4,222,277 | 9/1980 | Kurtz et al. ............................ 338/4 |
| 4,234,361 | 11/1980 | Guckel et al. .......................... 338/4 |
| 4,276,533 | 6/1981 | Tominaga et al. ..................... 338/4 |
| 4,317,126 | 2/1982 | Gragg, Jr. ............................... 338/4 |
| 4,370,890 | 2/1983 | Frick . |
| 4,467,656 | 8/1984 | Mallon et al. .................. 73/DIG. 4 |
| 4,484,212 | 11/1984 | Komatsu et al. ............... 73/DIG. 4 |
| 4,601,779 | 7/1986 | Abernathy et al. . |
| 4,645,887 | 2/1987 | Whiting .............................. 73/745 |
| 4,649,627 | 3/1987 | Abernathy et al. . |
| 4,658,651 | 4/1987 | Le ....................................... 73/721 |
| 4,773,269 | 9/1988 | Knecht et al. ...................... 73/721 |
| 4,790,192 | 12/1988 | Knecht et al. ..................... 73/721 |

OTHER PUBLICATIONS

Kurt E. Petersen, "Silicon as a Mechanical Material", Proceedings of the IEEE, vol. 70, No. 5, May 1982.
*Flat and Corrugated Diaphragm Design Handbook*, Chapters 12 and 13 by Mario DiGiovanni, Marcel Dekker, Inc. NY NY 1982.
"Differential Pressure Transmittal Operation".
"Foxboro/ICT Pressure Transducers", 1986 by the Foxboro Company.
"Model 2051 Metering Pressure Transmitter", Product Data Sheet 2502, 2/86 by Rosemont, Inc.
"Theory of Operation 34-ST-05-01".
J. B. Lasky et al., "Silicon-On-Insulator (SOI) by Bonding and Etch-Back", Int'l. Electrons Devices Mtg., 1985, Washington, D.C.
L. Tenerz et al., "Silicon Cavity Structures Fabricated with a New Technique", Electronics Dept., Institute of Technology, University of Uppsala, Uppsala, Sweden.
R. C. Frye et al., "A Field-Assisted Bonding Process for Silicon Dielectric Isolation", J. Electrochem. Soc.: Solid-State Science and Technology, Aug. 1986.
J. Ohura et al., "A Dielectrically Isolated Photodiode Array by Silicon-Wafer Direct Bonding", IEEE Electron Device Ltrs., vol. EDL-8, No. 10, Oct. 1987.

*Primary Examiner*—Joseph A. Orsino
*Assistant Examiner*—Brent A. Swarthout
*Attorney, Agent, or Firm*—Sanford J. Asman

[57] ABSTRACT

An electromechanical sensor is provided which comprises: first semiconductor wafer including a first stop surface residing in a first shallow recessed region of the first wafer; a second semiconductor wafer; wherein the first and second semiconductor wafers are laminated together such that the first recessed region of the first wafer and the second wafer define a first chamber in which the first stop surface and the second wafer are disposed close enough together such that the first stop surface restrains the second wafer from deflecting beyond the first stop surface; and an apparatus for measuring deflection of the second wafer.

23 Claims, 13 Drawing Sheets

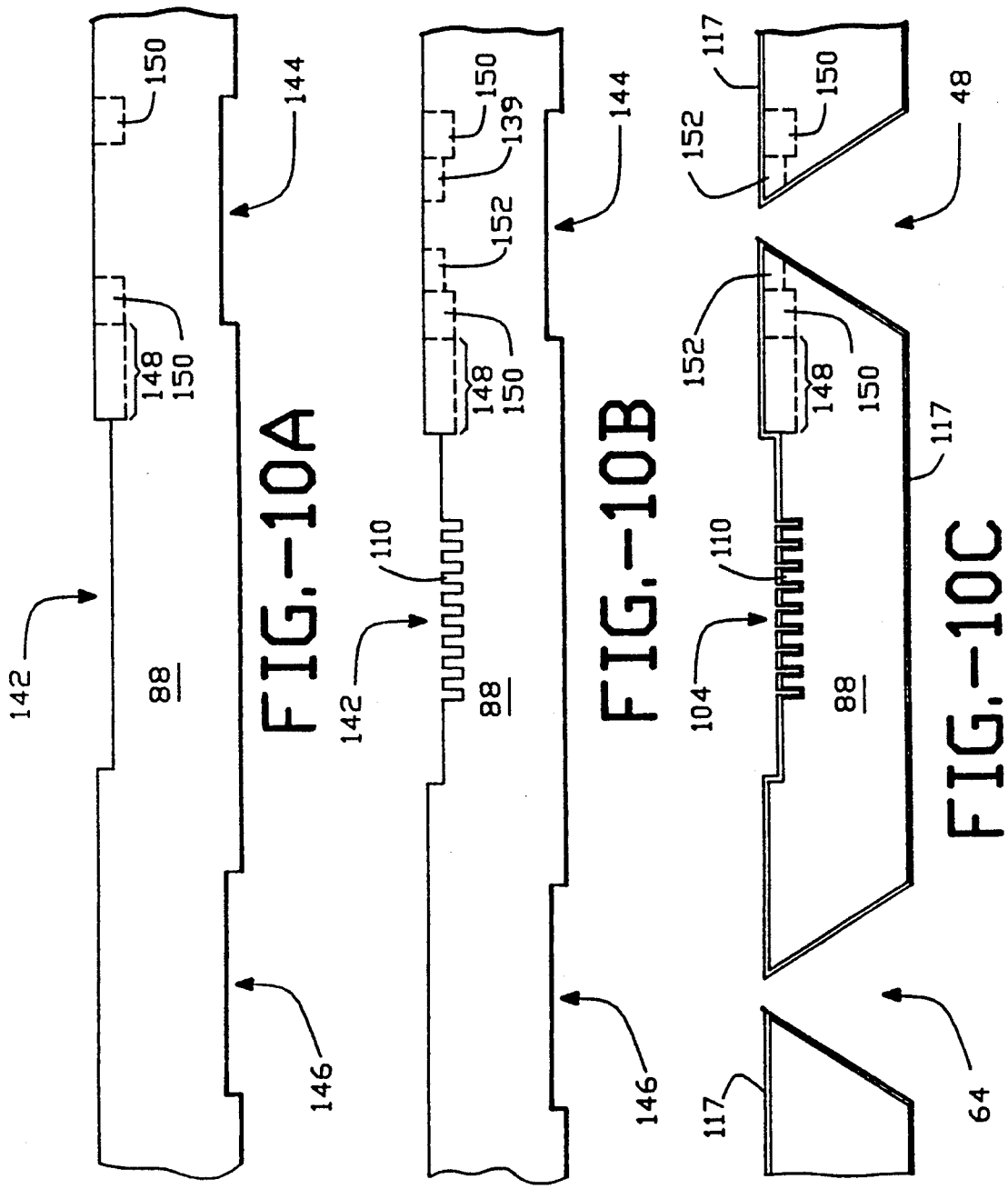

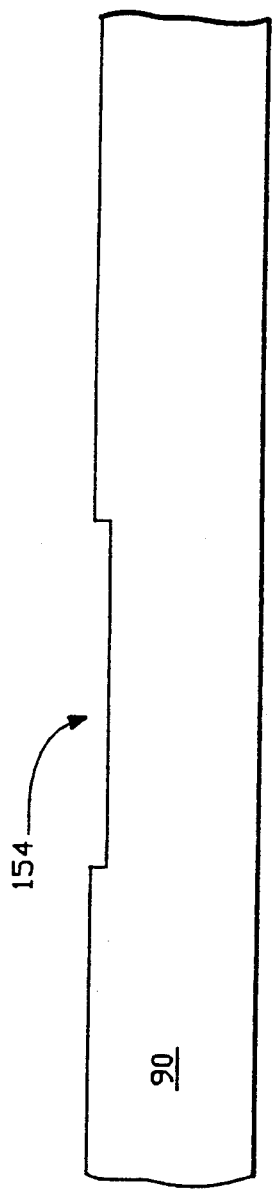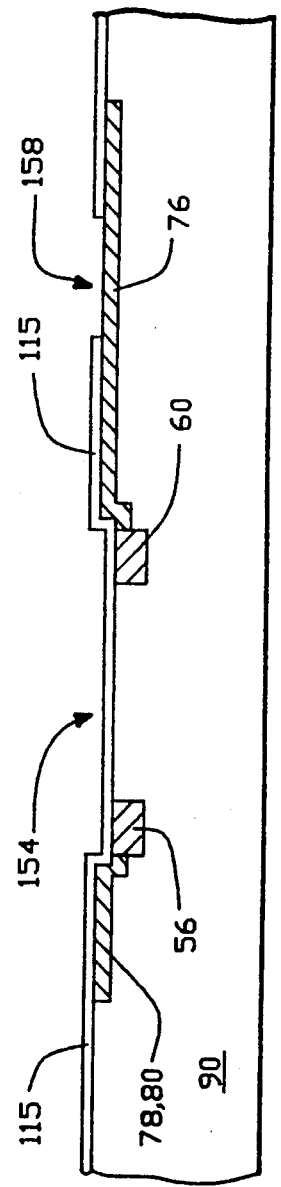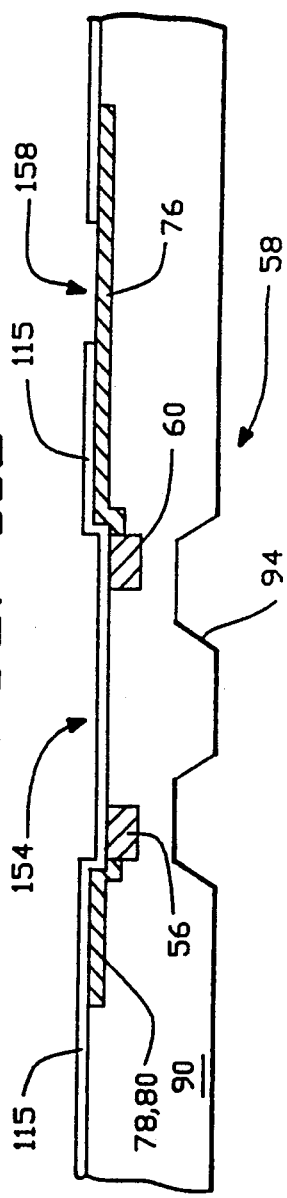

LAMINATED SEMICONDUCTOR SENSOR WITH OVERPRESSURE PROTECTION

This is a continuation of application Ser. No. 187,739, filed Apr. 29, 1988, now abandoned.

BACKGROUND OF THE INVENTION

This invention was made while the inventors were employed by Nova Sensor, Fremont, Calif. The patent application shall be assigned Schlumberger Industries, Ltd. pursuant to contractural obligations.

1. Field of the Invention

The invention relates to electromechanical sensors and more particularly to semiconductor sensors with overpressure protection.

2. Description of the Related Art

Silicon possesses well-known electrical and mechanical properties that are used in an ever-increasing variety of applications directed to the detection and measurement of the dynamics of physical processes. Many of the important electrical and mechanical qualities of silicon are explained by Kurt E. Petersen in "Silicon as a Mechanical Material", Proceedings of the IEEE, Vo. 70, No. 5, May 1982, which is incorporated herein by this reference.

In particular, the resistance value of a silicon resistor changes in response to a flexing of the silicon crystal. This piezoresistive response has been used to produce silicon-based pressure transducers. For example, a change in the differential pressure applied across a silicon diaphragm in which a resistor is formed causes a change in the resistor value. The change in the resistor value is approximately proportional to the change in differential pressure. Thus, measurement of the resistor value can be used to determine the differential pressure applied across the diaphragm.

In practice, changes in an individual resistor's value can be small and difficult to measure. Therefore, in a typical silicon diaphragm, four resistors are formed in a Wheatstone Bridge configuration. Even small changes in individual resistor values can contribute to a significant offset in the Bridge and can provide an easily detectable signal used to measure resistor value change.

In addition to silicon's piezoresistive qualities, it possess exceptional strength. It has an elastic modulus comparable to that of steel. Silicon's strength is most advantageous at microscopic size where it results in the considerable flexibility and resiliency of silicon microstructures.

Since silicon is a single crystal material, it is more resistant to cyclic mechanical stresses than are polycrystalline metals. It can be stressed repeatedly with little effect. Thus, it suffers virtually no measurable hysteresis or work hardening over time.

Devices incorporating silicon pressure sensors ordinarily are constructed so as to permit the silicon pressure sensor to interface with a measurand environment without contamination of the sensor. The sensor could be rendered inoperable by such contamination.

In some environments, a silicon pressure sensor can be adequately protected from environmental contaminants by coating it with a silicone gel. Silicones are chemically inert polymers containing chains of silicon atoms, in contrast to organic polymers which contain chains of carbon atoms. However, this approach can be insufficient in harsh environments. For example, a silicone gel provides inadequate protection in some process control applications which require long-term direct contact between a sensor and potentially corrosive fluids.

One earlier solution to the contamination problem in hostile environments is embodied in the exemplary sensor device 20 illustrated in FIG. 1. In essence, the device 20 isolates its semiconductor differential pressure sensor 25 from hostile measurand environments through the use of thin isolation diaphragms 22 and 24 which interface directly with the measurand environments. The pressure sensor 25 is sealed within a housing 27 and is mechanically coupled to each of the two isolation diaphragms 22 and 24 through an inert substantially incompressible fill material such as silicone oil. The oil completely fills each of a pair of discrete tubular conduits 28 and 30. A first conduit 28 communicates directly with one side of the pressure sensor 25 and with a first isolation diaphragm 22. A second conduit 30 communicates directly with the opposite side of the pressure sensor 25 and with a second isolation diaphragm 24.

In operation, the two isolation diaphragms 22 and 24 are exposed to two distinct measurand environments for which a pressure differential is to be measured A pressure difference between the two measurand environments causes a displacement of at least one of the two isolation diaphragms 22 and 24 which, in turn, leads to a pressure difference between the silicone oil volumes in the respective tubes 28 and 30. The result is a measurable differential pressure across the silicon differential pressure sensor 25.

While earlier silicon differential pressure sensors suitable for use with devices such as that shown in FIG. 1 have been acceptable, there have been shortcomings with their use. One such shortcoming stems from the need to protect such sensors from overpressure conditions. A pressure sensor could be damaged if exposed to an excessive differential pressure.

An overpressure condition could result, for example, if one of the two isolation diaphragms 22 or 24 was accidently exposed to the full static pressure of one of the two measurand environments. In practice, for example, the static pressure of the two measurand environments each might be on the order of 3000 pounds per square inch (PSI) while the pressure difference between the two measurand environments might be on the order of 10 PSI. Unfortunately, the semiconductor pressure sensor 25 could be damaged if the full static pressure was applied differentially across it. Consequently, precautions must be taken to prevent such damage.

In the past, such precautions generally involved schemes to prevent the exposure of a semiconductor pressure sensor to the full overpressure. One earlier scheme, illustrated in FIG. 1, involved the use of stop surfaces 32 and 34 which limited the range of motion of the isolation diaphragms 22 and 24. Even during exposure of one of the two isolation diaphragms to extreme overpressures, the displacement of the exposed isolation diaphragm would be limited by its corresponding stop surface. Therefore, the pressure sensor 25 would not be exposed to the full overpressure.

Earlier protection schemes, such as the two described above, generally have functioned but have been costly and difficult to manufacture. One reason is that such schemes typically require the manufacture of precision components used to prevent a silicon pressure sensor from being exposed to an overpressure condition. While these components have been used successfully to protect semiconductor pressure sensors from overpressure conditions, they often are expensive to produce and add significantly to overall cost of a device.

Thus, there has been a need for a silicon pressure sensor which can withstand overpressure conditions. The present invention meets this need.

SUMMARY OF THE INVENTION

The invention comprises a novel electromechanical sensor. The novel sensor includes a first semiconductor wafer including a first stop surface residing within a shallow recessed region. The first wafer is laminated to a second wafer such that the recessed region of the first wafer together with the second wafer define a first chamber. The first stop surface within the first chamber is disposed close enough to the second wafer such that said first stop surface restrains the second wafer from deflecting beyond the first stop surface. The sensor also includes an apparatus for measuring deflection of the second wafer.

The disposition of the second wafer in close enough proximity to the first stop surface to restrain the second wafer from deflecting beyond the stop surface advantageously can protect the second wafer from damage during overpressure conditions. The first stop surface provides mechanical support to the second wafer during overpressure conditions and thereby protects it.

These and other features and advantages of the present invention will become more apparent from the following description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIGS. 10A to 10C are side elevation views depicting a series of steps in the fabrication of the first wafer of the sensor of FIG. 2;

FIGS. 11A to 11C are side elevation views depicting a series of steps in the fabrication of the second wafer of the sensor of FIG. 2;

DETAILED DESCRIPTION OF THE PREFERRED EMBODIMENTS

The present invention comprises a novel semiconductor sensor with overpressure protection and an associated method for producing such a sensor. The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded with the widest scope consistent with the principles and features disclosed herein.

Figure 1:
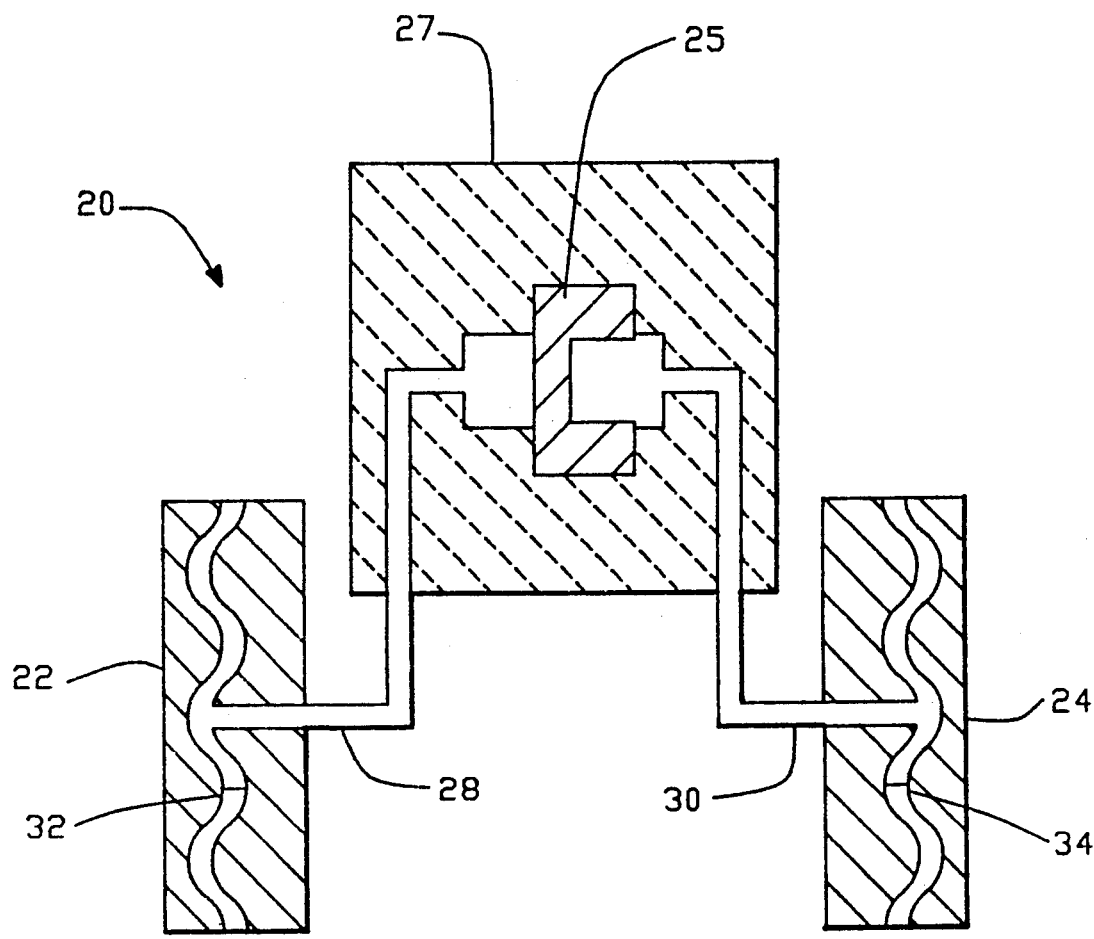
FIG. 1 is a cross-sectional view of an earlier device used to isolate a semiconductor differential pressure sensor from two measurand environments.
Figure 2:
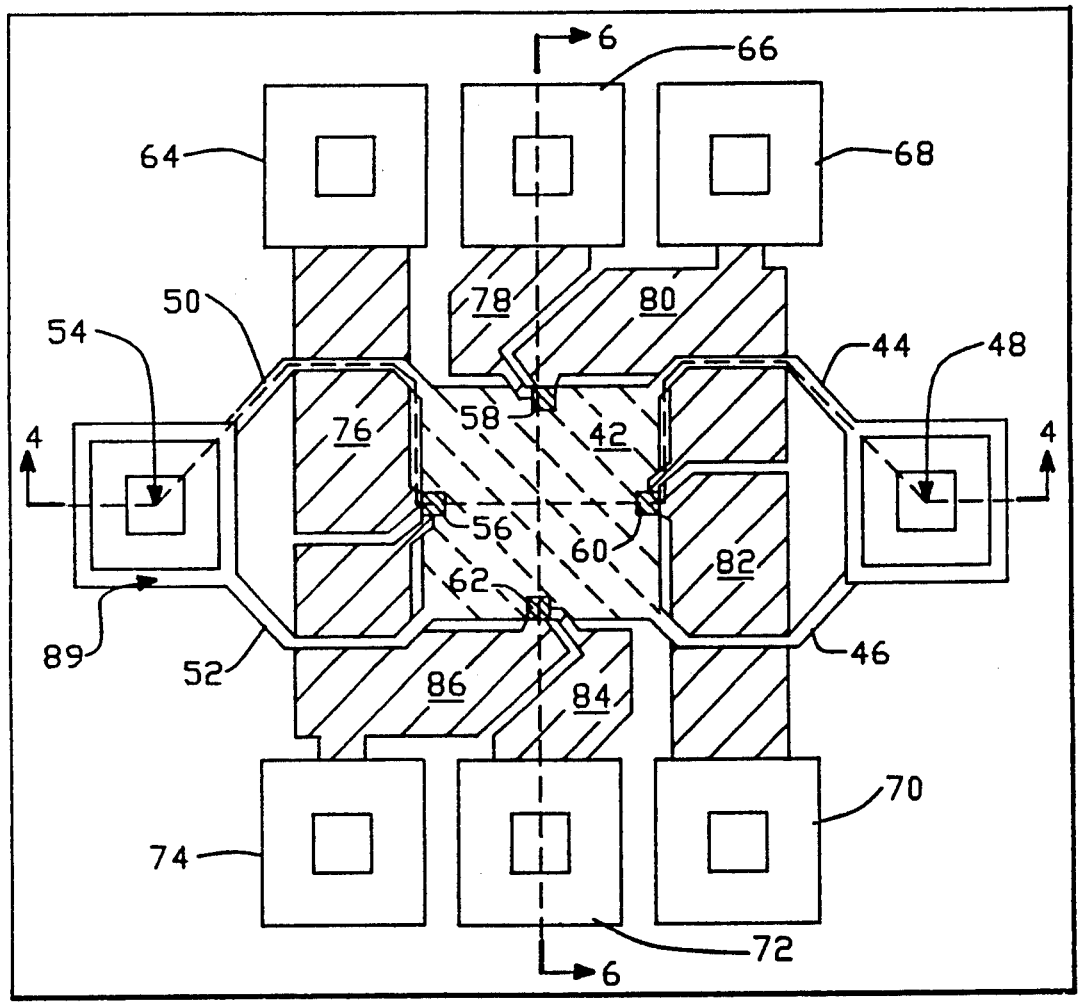
FIG. 2 is a top plan view showing a schematic representation of the layout of a first embodiment of a semiconductor sensor in accordance with the invention.

FIG. 2 is a schematic diagram illustrating the layout of the structures present in a differential pressure sensor 40 in accordance with the present invention. It will be appreciated from the discussion which follows that the sensor 40 is formed from three silicon wafers, and that many of the structures illustrated in FIG. 2 actually are formed in different silicon wafers.

Figure 4:
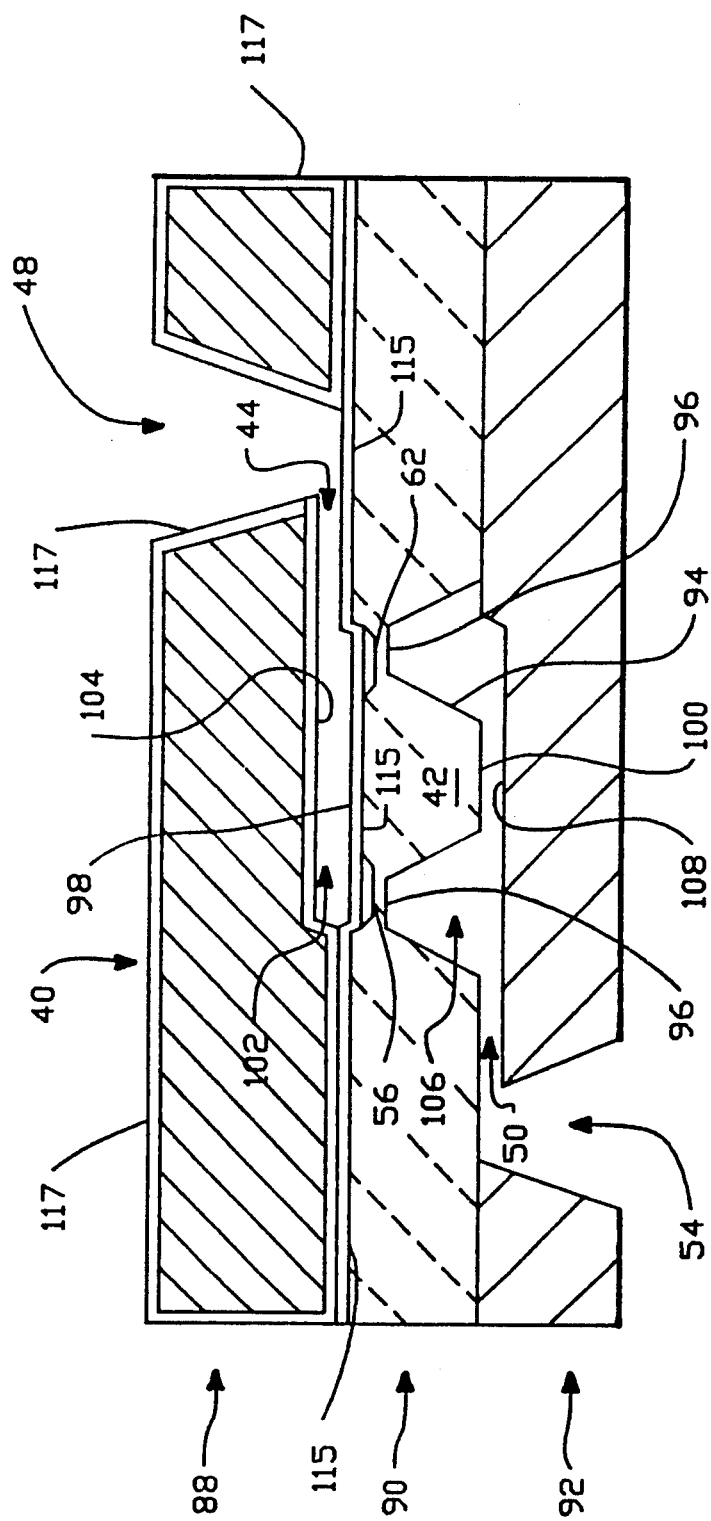
FIG. 4 is a sectional view along dashed lines 4—4 of FIG. 2.
Figure 6:
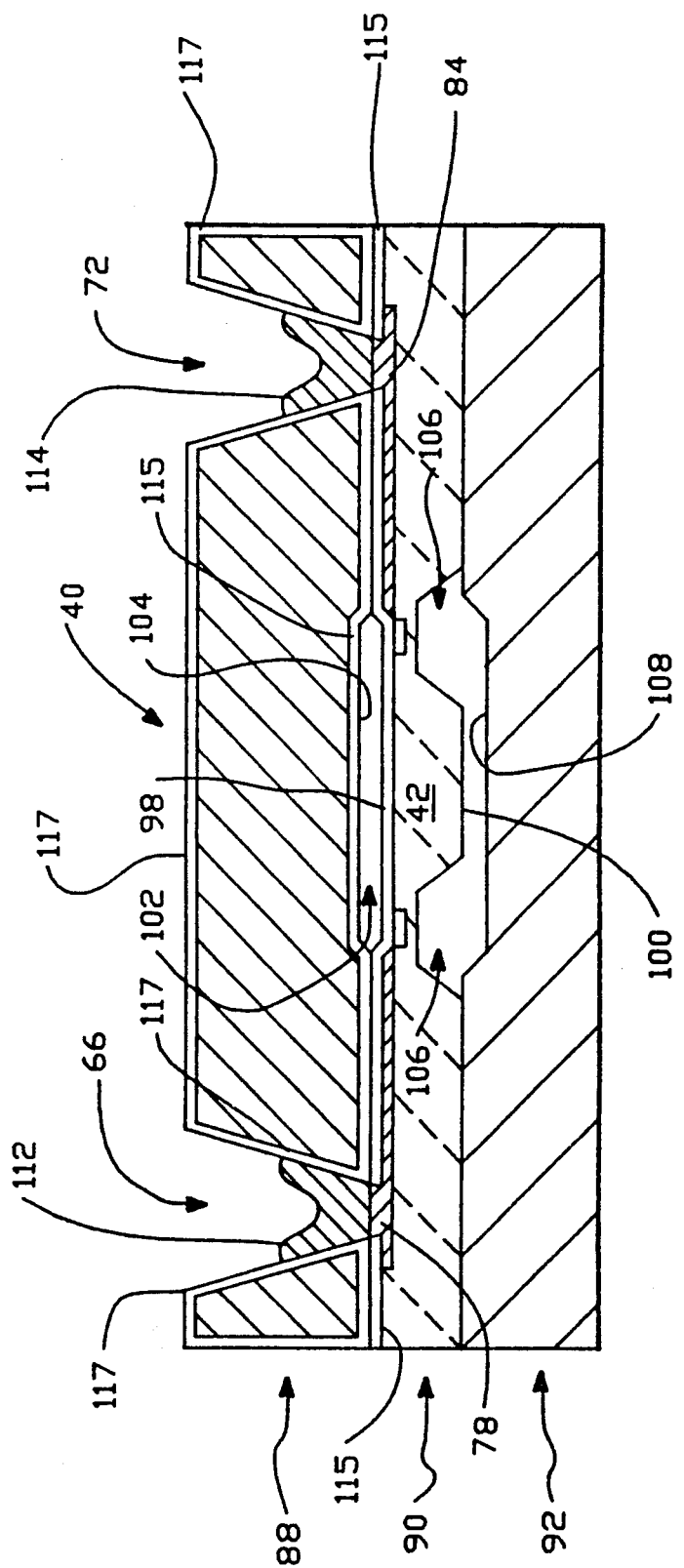
FIG. 6 is a sectional view along dashed lines 6—6 of FIG. 2.

A diaphragm 42 having a substantially rectangular horizontal cross-section is located near the center of the sensor 40. The diaphragm 42 separates a first chamber 102 located on a first side of the diaphragm from a second chamber 106 located on a second side. The first and second chambers 102 and 106 are illustrated in FIGS. 4 and 6. Two tubular conduits 44 and 46 communicate between the first chamber on the first side of the diaphragm 42 and a first fluid feedthrough port 48. Two other tubular conduits 50 and 52 communicate between the second chamber on the second side of the diaphragm 42 and a second fluid feedthrough port 54.

Four resistors identified as 56–62 comprise four respective P-type regions near the perimeter of the diaphragm 42. Each resistor is located near the center of a different side of the diaphragm 42. Six electrical feedthroughs identified as 64–74 are formed in the sensor 40 and are coupled to the resistors 56–62 so as to form a Wheatstone Bridge. Feedthrough 64 is electrically coupled via P+ region 76 to resistor 56. Feedthrough 66 is coupled via P+ region 78 to resistor 58. Feedthrough 68 is coupled via P+ region 80 to both resistors 58 and 60. Feedthrough 70 is coupled via P+ region 82 to resistor 60. Feedthrough 72 is coupled via P+ region 84 to resistor 62. Finally, feedthrough 74 is electrically coupled to both resistors 56 and 62 via P+ region 86.

In operation, the respective first and second fluid feedthrough ports 48 and 54 are coupled to two distinct reservoirs (not shown) of an inert substantially incompressible fluid such as silicone oil. Silicone oil provided through the first port 48 fills tubular conduits 44 and 46 and the first chamber 102. Silicone oil provided through the second port 54 fills tubular conduits 50 and 52 and the second chamber. In a manner which will be understood to those skilled in the art, the diaphragm 42, therefore, can be coupled to two distinct measurand environments through the silicone oil. A pressure difference between the measurand environments will result in a pressure difference between the two silicone oil volumes on opposite sides of the diaphragm 42 and a differential pressure across the diaphragm 42. The result is a measurable deflection of the diaphragm 42.

The resistor values of the four resistors 56-62 change in response to such a deflection. The offset in the bridge output voltage caused by the changed resistor values is used to calculate the differential pressure between the measurand environments.

Figure 3:
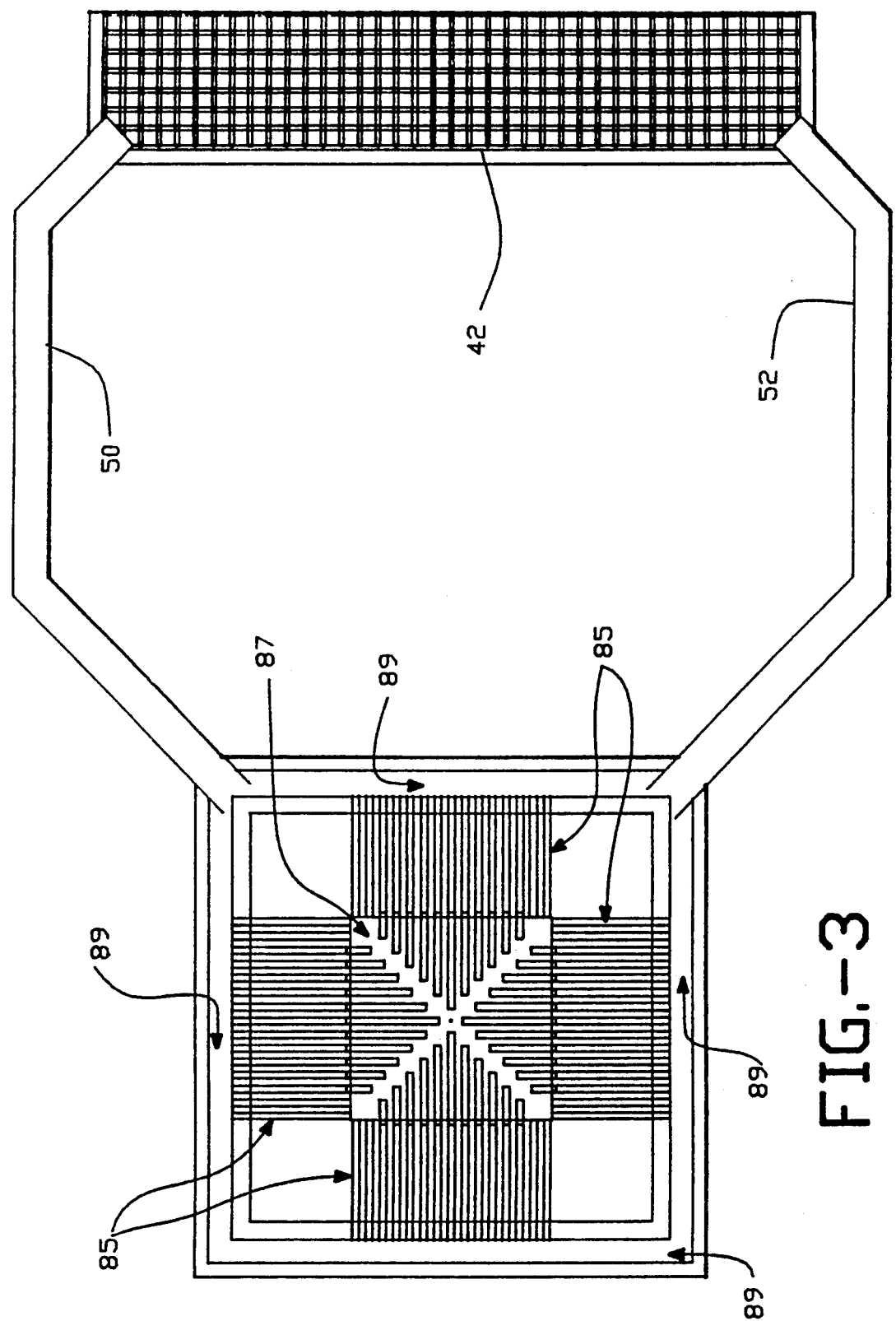
FIG. 3 is a more detailed top plan view of the second fluid feedthrough port of the sensor of FIG. 2.

Referring now to the illustrative drawings of FIG. 3, there are shown details of the second fluid feedthrough port 54. The second port 54 has vertical channels 85 formed in it which serve to filter silicone oil flowing from the port 54 to the two tubular conduits 50 and 52. This filtering helps to prevent clogging of the port 54. Clogging, for example, can result from particle contamination of the silicone oil.

In particular, the second feedthrough port 54 includes a central square-shaped opening 87 through which silicone oil can be provided. A plurality of vertical channels 85 protrude into this opening 87 and provide a plurality of narrow flow paths between the central opening 87 and a four-sided plenum region 89. The plenum region 89 comprises four elongated channels of equal length which intersect so as to form a square. Tubular conduits 50 and 52 provide duplicate flow paths between the plenum region 89 and the second chamber 106.

It will be appreciated that the vertical channels 85 permit the passage therethrough of silicone oil, but prevent the passage of larger particulate contaminants which could clog the plenum region 89 or either of the conduits 50 or 52. Two tubular conduits 50 and 52 are provided in part for symmetry and for redundancy in case one of them becomes inoperative. The first fluid feedthrough port 48 has substantially identical structural features.

FIG. 4, provides a sectional view of the sensor 40 showing further details of the diaphragm 42. The sensor 40 includes three silicon wafers 88, 90 and 92 which are laminated together as described below. The first and third wafers 88 and 92 typically are 350-500 microns thick. The second wafer typically is approximately 200 microns thick when a central boss 94, discussed below, is employed. The second wafer 90 is sandwiched between respective first and third wafers 88 and 92. The first port 48 is formed in the first silicon wafer 88. It communicates with the first chamber 102 via tubular conduit 44 and tubular conduit 46 (not shown) which are defined by the first and second silicon wafers 88 and 90. The second port 54 is formed in the third silicon wafer 92. It communicates with the second chamber 106 via tubular conduit 50 and tubular conduit 52 (not shown) which are defined by the second and third silicon wafers 90 and 92.

Tubular conduits 44 and 46 are defined by depressions formed in the first wafer 88 which are then overlayed by the second wafer 90 as described below. Tubular conduits 50 and 52 are defined by depressions formed in the third layer 92 which are then overlayered by the second layer 90 as described below. Each conduit typically is approximately 50 microns wide, 2-30 microns deep and approximately 1.2 mm in total length.

The diaphragm 42 is formed in the second silicon wafer 90. The diaphragm 42 includes a boss 94 having a square horizontal cross-section upstanding from a rectangular perimeter section 96. The boss 94 is tapered on all four sides such that the diaphragm 42 provides a first contact surface 98 adjacent to the first wafer 88 which is larger than a second contact surface 100 adjacent to the third wafer 92.

The diaphragm 42 measures approximately 1.2 mm along each side of its square perimeter section 96. The thickness of the perimeter section 96 typically is 5-40 microns. The boss 94 typically is on the order of 900 microns square in area at its widest portion and is on the order of 600 micron$^2$ at its narrowest portion.

The first silicon wafer 88 and the second silicon wafer 90 together define the first chamber 102. As explained below, the vertical distance between the first contact surface 98 and the first stop surface 104 depends upon the differential pressure at which the first contact surface 98 is to abut against the first stop surface 104 for mechanical support.

Similarly, the third silicon wafer 92 and the second silicon wafer 88 together define the second chamber 106. A second stop surface 108 is formed on the third silicon wafer 92 directly opposite the second contact surface 100. As explained below, the vertical distance between the second contact surface 100 and the second stop surface 108 depends upon the differential pressure at which the second contact surface 100 is to abut against the second stop surface 108 for mechanical support.

Figure 5:
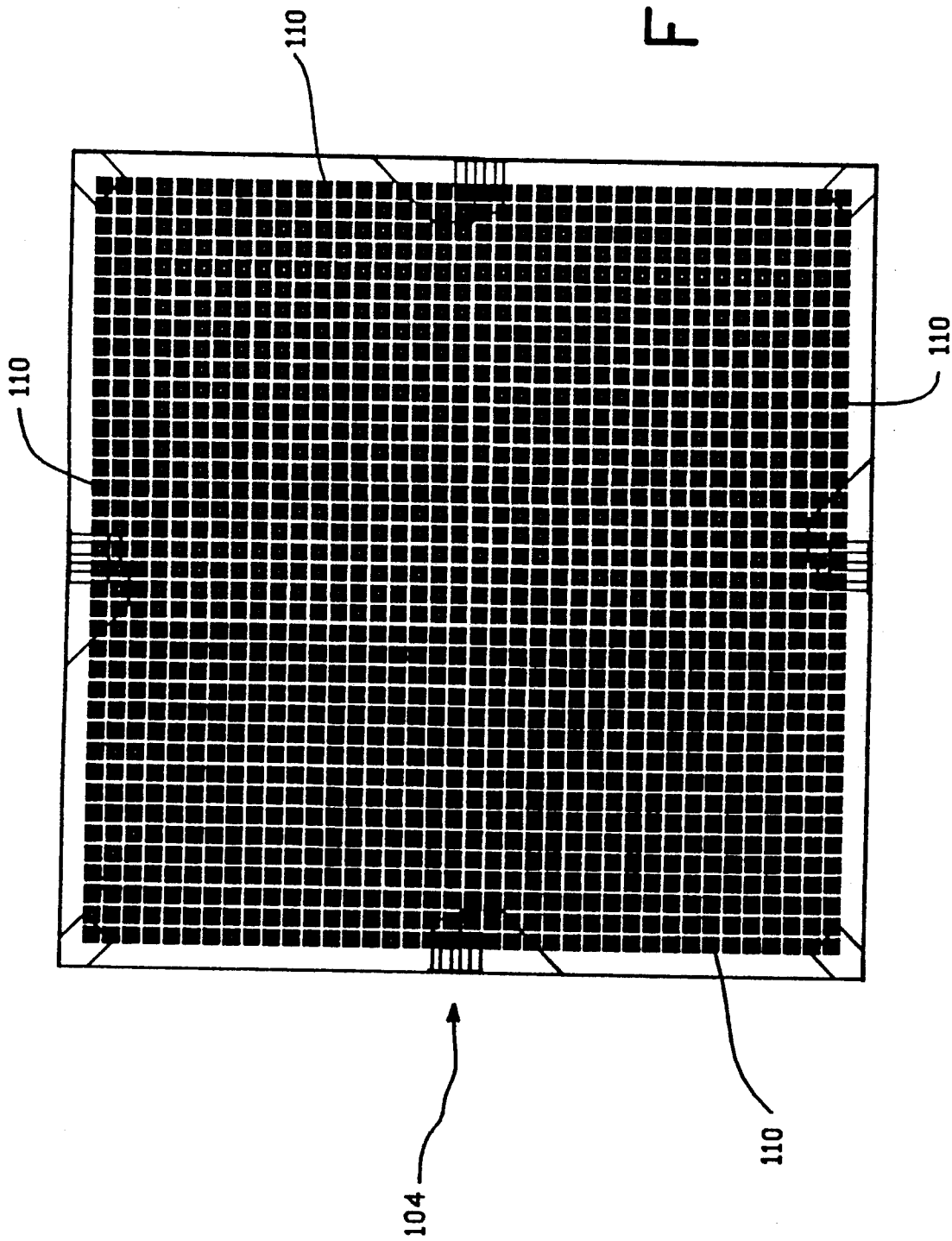
FIG. 5 is a top plan view of the first stop surface of the sensor of FIG. 2.

The first and second stop surfaces 104 and 108 include a multitude of stipples. FIG. 5 illustrates the multitudinous stipples 110 formed in the first stop surface 104. Each stipple 110 comprises a tapered member having a height of 0.5-10.0 microns, having a rectangular horizontal cross-section and having its largest cross-sectional area near its base. The stipples 110 are arranged in a compact pattern comprising an array of parallel columns and parallel rows.

Referring now to the illustrative drawings of FIG. 6, there is shown another cross-sectional view of the sensor 40 showing further details of electrical feedthroughs 66 and 72 and their coupling to resistors 58 and 62 respectively. An aluminum contact 112 is formed in feedthrough 64 so as to provide an electrical connection with P+ region 78 which is electrically coupled to resistor 58. Similarly, an aluminum contact 114 is formed in feedthrough 72 so as to provide an electrical connection with resistor 62. Electrical isolation of the electrical feedthroughs 64-74 are provided by an oxide layer 117 formed on the first wafer 88 and another oxide layer 115 formed on the surface of the second wafer 90 in contact with oxide layer 117.

Figure 7:
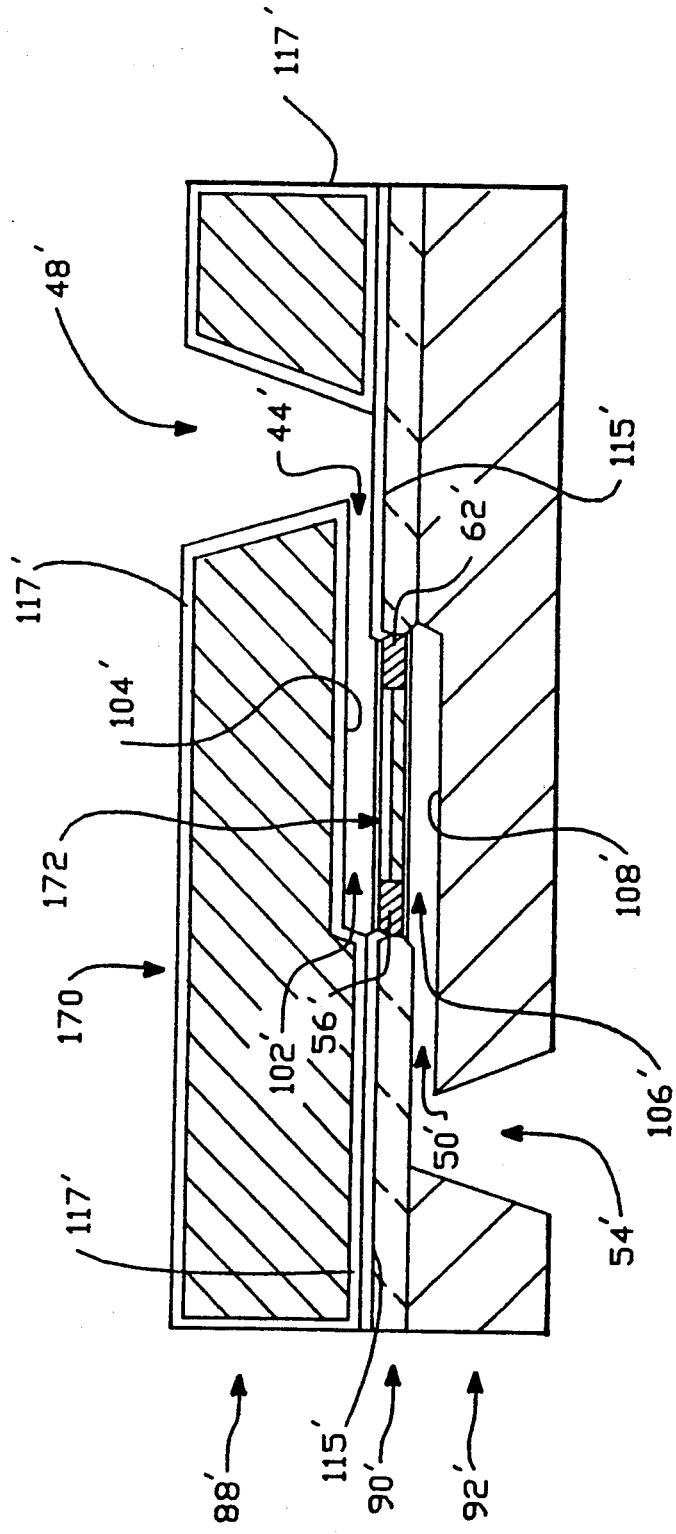
FIG. 7 is a sectional view like that of FIG. 4 of a first alternative embodiment of the invention.

FIG. 7 illustrates a first alternative embodiment 170 of a sensor in accordance with the invention. The first alternative embodiment 170 lacks a boss structure on its diaphragm 172. Otherwise, except as explained below, it is substantially identical to the sensor 40 of FIGS. 2, 4 and 6. The view shown in FIG. 7 is a cross-sectional view like that of FIG. 4. Components of the first alternative embodiment which are substantially identical to those of the sensor 40 of FIG. 2 are identified by primed reference numerals identical to those used for corresponding components of the sensor 40. The second wafer 90' of the first alternative embodiment 170 is only 5-60 microns thick.

Figure 8:
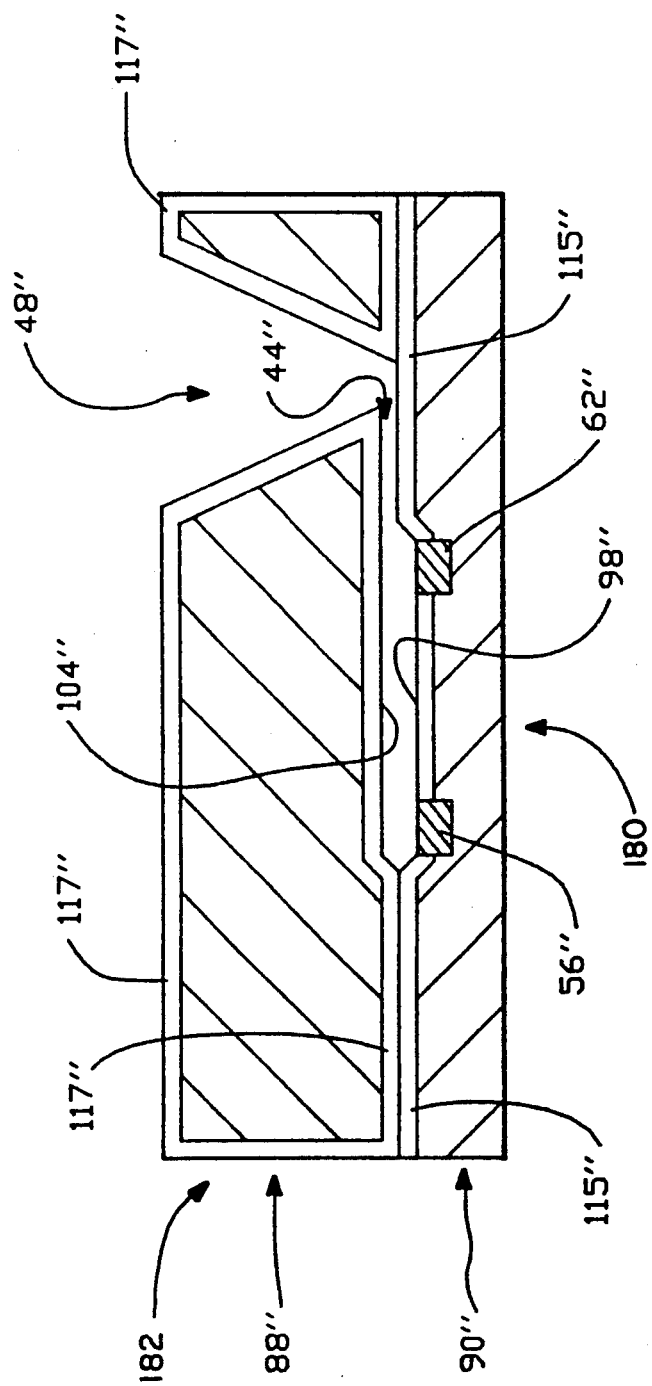
FIG. 8 is a sectional view like those of FIGS. 4 and 7 of a second alternative embodiment of the invention.

FIG. 8 illustrates a second alternative embodiment 180 of a sensor in accordance with the invention. The second alternative embodiment 180 lacks a boss structure on its diaphragm 182 and has only two semiconductor wafers 88" and 90". The view shown in FIG. 8 is a cross-sectional view like those of FIGS. 4 and 7. Components of the second alternative embodiment 180 which are substantially identical to those of the first alternative embodiment are identified by double primed reference numberals identical to those used for corresponding components of the first alternative embodiment 170. The second wafer of the second alternative embodiment 180 is only 5-40 microns thick, substantially the same thickness as the diaphragm 182 itself.

In operation, respective distinct reservoirs of silicone oil, or another suitable inert substantially incompressible fill material, respectively occupy the first and second chambers 102 and 106. The reservoirs of silicone oil respectively communicate with chambers 102 and 106 through the first and second fluid feedthrough ports 48 and 54 via corresponding tubular conduits 44, 46, 50 and 52. The application of different pressures to the reservoirs of silicone oil in the respective first and second chambers 102 and 106 causes a deflection of the diaphragm 42 in a direction away from the reservoir which is under higher pressure. The resultant change in the resistor values of resistors 56-62 causes a measurable change in the offset of the Wheatstone Bridge which can be used to calculate the differential pressure between the first and second chambers 102 and 106.

The respective first and second stop surfaces 104 and 108 advantageously limit the range of deflection of the diaphragm 42. For example, if an overpressure is applied to the silicone oil reservoir occupying the second chamber 106 then the first contact surface 98 of the diaphragm will be driven into abutting contact with the first stop surface 104. Conversely, if an overpressure is applied to the silicone oil reservoir occupying the first chamber 102 then the second contact surface 100 will be driven into abutting contact with the second stop surface 108.

When exposed to a relatively small differential pressure, the center of the diaphragm 42 will deflect approximately linearly with the applied pressure difference. The boss 94 causes the diaphragm to deflect approximately linearly with applied differential pressure for somewhat higher pressure differences than if the boss 94 were absent as it is in the respective first and second alternative embodiments 170 and 180. Linear deflection versus pressure differential produces a linear relationship between the output of the Wheatstone Bridge and the pressure differential. This linear relationship is desired in many applications because it simplifies subsequent electronic signal conditioning.

For applied pressure differences that are very high the respective diaphragms 42, 172 and 182 discussed above, will break. Breakage usually occurs at the edges of the respective diaphragms 42, 172 or 182 where the internal stress in the silicon diaphragm due to the applied pressure are greatest in magnitude.

Thus, the respective diaphragms 42, 172 and 182 must be spaced far enough from their respective protective first and second stop surfaces (the second alternative embodiment has no second stop surface) to permit deflection in response to differential pressures within the linear range. The respective diaphragms 42, 172 and 182, however, must be spaced close enough to prevent excessive deflection which might lead to rupture or breakage of the diaphragms 42, 172 or 182.

For a diaphragm 172 such as that shown in FIG. 7 which lacks a central boss, it is known from experimental data that acceptable linearity of deflection versus pressure can be achieved for differential pressures of approximately 10 PSI and somewhat higher. It is also known that such a diaphragm will almost always break at a lower differential pressure than 700 PSI. Thus, if it is desired that the sensor 170 operate in an environment which could produce differential pressures above 700 PSI, it is desirable to provide mechanical stop surfaces 104' and 108' for this diaphragm against which the diaphragm 172 will impinge at some differential pressure above 10 PSI but below 700 PSI. To minimize the chance of breakage, it is desirable that the mechanical stop surfaces 104' and 108' be contacted by the diaphragm at a differential pressure only slightly above 10 PSI.

Through experiments and mathematical modelling using finite element analysis techniques it has been found that it is desirable to space the respective first and second stop surfaces 104' and 108' approximately 2 microns from the zero-deflection position of a diaphragm 172 having the typical dimensions discussed above. Such 2 micron spacing leads to mechanical stopping at approximately 20 PSI of applied differential pressure. At this pressure the center of the diaphragm touches one of the stop surfaces 104' or 108' and is supported against further motion by that stop surface. For increasing pressure above the touching pressure, an increasing area of the diaphragm 172 comes into contact with the stop surface so as to become supported against further motion. The effect of such increasing area in contact with a stop surface is to decrease the remaining diaphragm area which must support the applied overpressure by itself without any support from the stop surface.

Thus, as applied pressure increases, the unsupported area of the diaphragm 172 decreases, and the total force applied to the unsupported diaphragm area increases more slowly than it would in the case where the entire diaphragm 172 was supported only at its perimeter without any support near its center. The diaphragm 172 when supported against a mechanical stop surface, therefore, can withstand a higher pressure differential than it could without such support.

It will be appreciated that the above dimensions and pressures are by way of example only. It is well known that the deflection of a diaphragm versus pressure decreases as diaphragm thickness increases or as lateral diaphragm dimensions decrease, and that the average breaking pressure for a diaphragm increases as diaphragm thickness increases or as lateral diaphragm dimensions decreases. It is also well known to create diaphragms which are not rectangular in lateral dimensions, but which are circular or indeed of almost any shape. Furthermore, it is known that the breaking strength of a diaphragm will vary with the quality and yield strength of the silicon with which it is formed, and with the quality and yield strength of any additional materials deposited on the diaphragm. Thus, the dimensions, shape and composition of the diaphragms 42, 172 and 182 can vary without departing from the spirit and scope of the present invention. The behavior of diaphragms under stress is discussed in the chapters entitled "Bending Diaphragms Under Lateral Pressure" and "Flat Diaphragms With Rigid Center" of the book, *Flat and Corrugated Diaphragms Design Handbook*, Marcel Dekker, Inc., New York and Basel, 1982 which are incorporated herein by this reference.

Referring to FIGS. 4, 5 and 6, it will be appreciated that the stipples 110 ensure that the diaphragm 42 does not stick to either of the stop surfaces 104 or 108 following the application of an overpressure to the diaphragm 42. More specifically, referring to FIGS. 4 and 5, when the first contact surface 98 is pressed against the first stop surface 104 during an overpressure condition, the tops of the multitudinous stipples 110 will abut against the first contact surface 98. Consequently, there will be an array of interstitial spaces through which silicone oil can flow. This flow of silicone oil within these interstitial spaces substantially prevents the first contact surface 98 from sticking to the first stop surface 104. The same principles hold for the stipple pattern formed on the second stop surface 108.

FIGS. 9-12 illustrate a method for fabricating the sensor 40 of FIGS. 2-6. Those skilled in the art will also appreciate how to fabricate the sensors of the alternative embodiments 170 and 180 from the following description. Intermediate process steps which are standard and well known such as the growth of intermediate oxide or nitride layers, the deposition of photo-resist layers and photolithographic patterning are not described. Those skilled in the art will understand how to practice the invention without a detailed description of such standard and well known steps.

Furthermore, FIGS. 9-12 are not intended to represent the true layout of all of the structural components in the sensor 40. Dispersed structural components of the sensor 40 are shown in the single set of related FIGS. 9-12 merely to simplify the explanation of the processing steps in the fabrication of the sensor 40. For example, it will be appreciated that the first and second fluid feedthrough ports 48 and 54 are not disposed relative to electrical feedthrough 64 as suggested in FIGS. 9-12.

To begin, it should be noted that the three wafers 88, 90, and 92 are [100] oriented wafers. When assembled, as explained with respect to FIG. 12, they are aligned with respect to crystallographic direction.

FIGS. 9A-9D illustrate the processing steps involving the third silicon wafer 92. The third wafer 92 is approximately 0.4 mm thick and can be formed from either n-type or p-type silicon. The third wafer 92 first is polished on both surfaces.

Figure 9A:
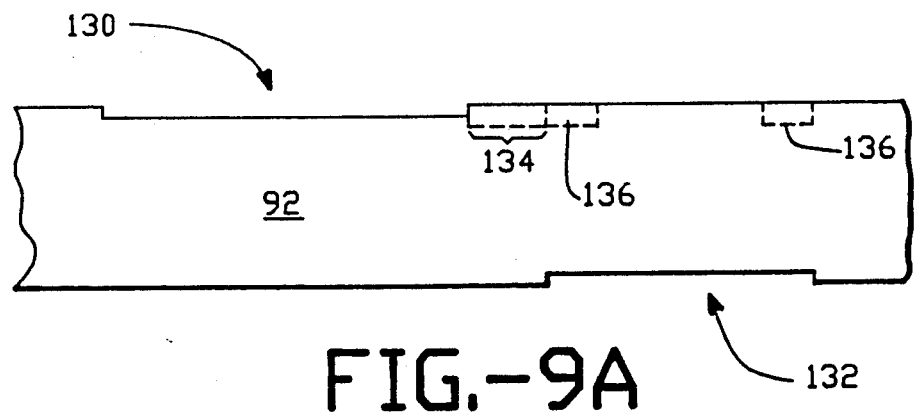
FIGS. 9A to 9D are side elevation views depicting a series of steps in the fabrication of the third wafer of the sensor of FIG. 2.

In the step shown in FIG. 9A, shallow top and bottom depressions 130 and 132 are etched onto both sides of the third wafer 92. The depressions 130 and 132 which are approximately 0.5 to 5.0 microns deep, can be etched using wet etching of silicon or plasma etching or differential oxide growth. The top depression 130 will define a gap through which the diaphragm 42 will travel before abutting against the second stop surface 108. The top depression 130 is square in shape and has dimensions of approximately 1.2 mm on each side. The bottom depression 132 defines the the future location of the second fluid feedthrough port 54 which will be etched through later in the process. The bottom depression 132 also is square in shape and measures approximately 0.65 mm on each side.

Additionally, during the step illustrated in FIG. 9A two conduit-forming depressions and a plenum-forming depression are formed in the third wafer 92. The plenum-forming depression comprises four elongated depressions which intersect in the form of a square. One of the two conduit-forming depressions is represented in FIG. 9A by dashed lines 134. Two sides of the four-sided plenum-forming depression are represented in FIG. 9A by dashed lines 136. The conduit-forming depressions 134 and the plenum-forming depression 136 are also etched to a depth of approximately 0.5-5.0 microns using any of the etching processes described above.

Figure 9B:
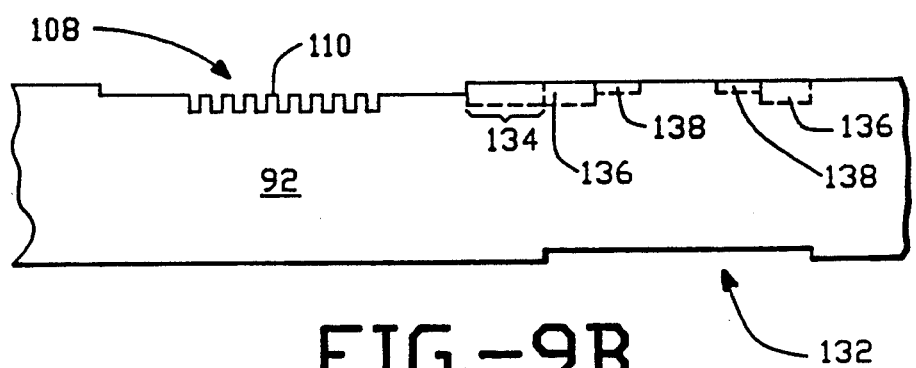

In the step illustrated in FIG. 9B, a second etch is defined on the top surface of the third wafer 92. This second etch is approximately between 0.5 and 10.0 microns deep. During this etch step the two conduit-forming depressions and the plenum-forming depression are deepened by between 0.5 and 10.0 microns. Also, the stipples 110 are formed in the second stop surface 108. The stipples 110 are between 0.5 and 10.0 microns in height. Furthermore, during this step, the filter channels 85, represented by dashed lines 138, are formed along the inner perimeter of the plenum-forming depression 136. The filter channels also are between 0.5 and 10.0 microns deep.

It will be appreciated that the etching step illustrated in FIG. 9B actually involves multiple iterations of several sets of intermediate steps. In each iteration, oxide or nitride layers are grown, photo-resist layers are deposited and photolithographic patterning is performed.

Figure 9C:
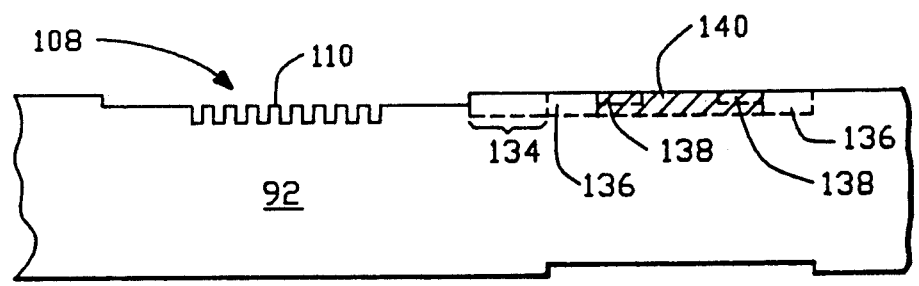

In the step illustrated in FIG. 9C, a heavily boron-doped P+ region 140 about 3.0 microns thick is created where the second fluid feedthrough port 54 will be formed. The boron impurity concentration is at least $7 \times 10^{19}$ atoms per cubic centimeter. The heavily doped region 140 will serve as an etch stop during the etching of the second port 54. As explained below, the heavily doped region 140 protects the filter channels 120 and fluid conduits 50 and 52 which communicate with the second port 54 from particle contamination during later processing steps.

Figure 9D:
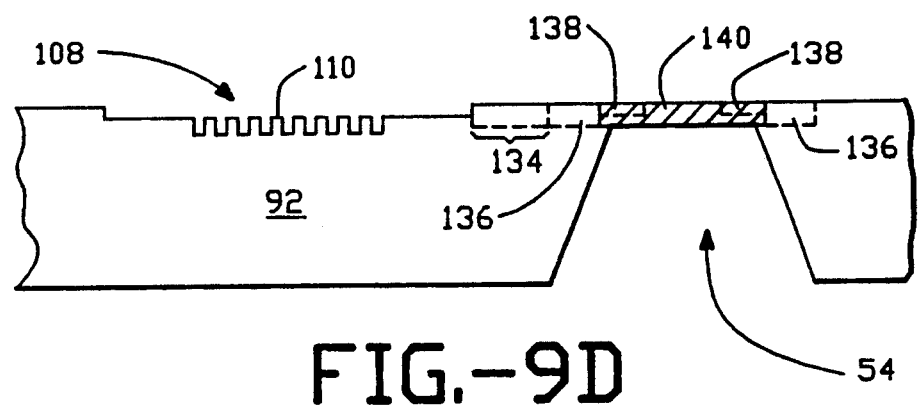

In the step shown in FIG. 9D, the second fluid feedthrough port 54 is etched with an anisotropic etchant such as KOH and water or ethylenediamine, pyrocatechol and water or hydrazine and water. The etchant will stop at the P+ region 140, leaving a thin supported film of doped silicon approximately 3.0 microns thick. Of course, like the steps described above, the step shown in FIG. 9D involves several intermediate steps in which oxide or nitride layers are grown, photo-resist layers are deposited and photolithographic patterning is performed.

FIGS. 10A-10C illustrate the processing steps involving the first silicon wafer 88. The first wafer 88 is approximately 0.4 mm thick and can be formed from either n-type or p-type silicon. The first wafer is first polished on both surfaces.

The processing steps for the first wafer 88 closely resemble those of the third wafer 92. In the step illustrated in FIG. 10A, one top and two bottom shallow depressions 142, 144 and 146, respectively, are etched onto the first wafer 88. These depressions are approximately 0.5 to 5.0 microns deep. They can be etched using the techniques mentioned above: wet etching of silicon, plasma etching or differential oxide growth. The top depression 142 will define the gap through which the diaphragm 42 will travel before abutting against the first stop surface 104. The top depression 142 is square in shape having dimensions of approximately 1.2 mm on each side. The bottom depression labelled 144 defines the future location of the first fluid feedthrough port 48. The bottom depression labelled 146 defines the future location of one of the future electrical feedthroughs 64. Both bottom depressions are square in shape and measure approximately 0.65 mm on each side.

Additionally, during the step illustrated in FIG. 10A, two conduit-forming depressions and a four sided plenum-forming depression are formed in the first wafer 88. One of the two conduit-forming depressions is represented in FIG. 10A by dashed lines 148. Two sides of the plenum-forming depression are represented by dashed lines 150. The conduit-forming depressions 148 and the plenum-forming depressions 150 are etched to a depth of approximately 0.5 to 5.0 microns using any of the etching processes described above.

As mentioned above, the respective first and second ports and the electrical feedthrough 64 are shown in FIGS. 9-12 to illustrate their method of fabrication. Their positions relative to each other as shown in these Figures are not intended to represent their actual positions in the sensor 40.

In the step illustrated in FIG. 10B, a second etch is defined on the bottom surface of the first silicon wafer 88. This second etch is approximately between 0.5 and 10.0 microns deep. During this second etching step, the two conduit-forming depressions 148 and the four sided plenum-forming depression 150 are deepened by 0.5-10.0 microns. Also, the stipples 110 are formed in the first stop surface 104. The stipples 110 are 0.5-10.0 microns in height. Furthermore, during this step filter channels, represented by dashed lines 152, are formed along the inner perimeter of the four sided plenum-forming depression 150. The filter channels are between 0.5 and 10.0 microns deep. As with the etching step in FIG. 9B, it will be appreciated that the etching step in FIG. 10B actually involves multiple iterations of several sets of intermediate steps.

In FIG. 10C, the first fluid feedthrough port 48 is etched with an anisotropic etchant such as KOH and water or ethylenediamine, pyrocatechol and water or hydrazine and water. In addition, the electrical feedthrough 64 is similarly etched.

After the etching steps for the first wafer 88 are completed, the entire first wafer 88 is oxidized to a uniform thickness of between 0.1 and 1.0 microns. This resulting uniform oxidized layer 117 provides electrical isolation of the electrical feedthroughs 64–74 of the sensor 40.

It will be appreciated that the order in which the etch steps illustrated in FIGS. 9 and 10 are performed is not important. Thus, these steps can be performed in a different order without departing from the invention. For example, the etching steps described with respect to FIG. 10B could be performed before those described with respect to FIG. 10A. Similarly, for example, the etch steps illustrated in FIG. 9B could be performed before those illustrated in FIG. 9A.

FIGS. 11A-11C illustrate the processing steps involving the second silicon wafer 90. The second wafer 90 is formed from n-type silicon or from a P-type silicon substrate with an n-type silicon epitaxial layer 5-60 microns thick. It is approximately 0.4 mm thick.

In FIG. 11A, a first shallow top depression 154 is etched into the wafer 90. This depression defines the active diaphragm region. Any of a number of processes can be employed in this etching step including plasma etching, wet etching, and differential oxide growth. The top depression 154 is square in shape and measures approximately 1.2 mm on each side, and it is between 0.1 and 3.0 microns deep. By recessing the active diaphragm region in this manner, small misalignments between the first and second wafers 88 and 90 during the lamination process discussed with reference to FIG. 12 will not detrimentally affect diaphragm performance.

In the steps illustrated in FIG. 11B, standard integrated circuit processes are used to grow an oxide layer 115 approximately 0.2 microns thick. Next, P-type resistors 56 and 60 are formed in the n-type second silicon wafer 90. In addition, more heavily-doped P-type regions 76 and 78/80 are formed. The resistors 56 and 60 and the P-type regions 76 and 78/80 can be formed by ion implantion or diffusion. After their implantion or diffusion, they are annealed to activate the impurity. As discussed above, the more heavily doped P-type regions will react as low-resistance electrical interconnect paths extending between the P-type resistors and the electrical feedthroughs. Also, a hole 158 is etched through the oxide layer 115 to permit electrical contact between P-type region 76 and via the electrical feedthrough 64.

In the step illustrated in FIG. 11C, the second wafer 90 is thinned to between 100 and 400 microns. The amount of thinning depends upon whether a boss is to be present and upon the desired thickness of the diaphragm. The bottom side 161 of the second wafer 90 then is polished, and a chemical resistant etchmask such as silicon-nitride, silicon dioxide, or Cr/Au is deposited on it. After patterning of the etchmask, the second layer 90 is anisotropically etched to thin the diaphragm 42 and to form a raised boss 94. The masking wafer is then stripped from the bottom side of the second wafer 90.

Figure 12A:
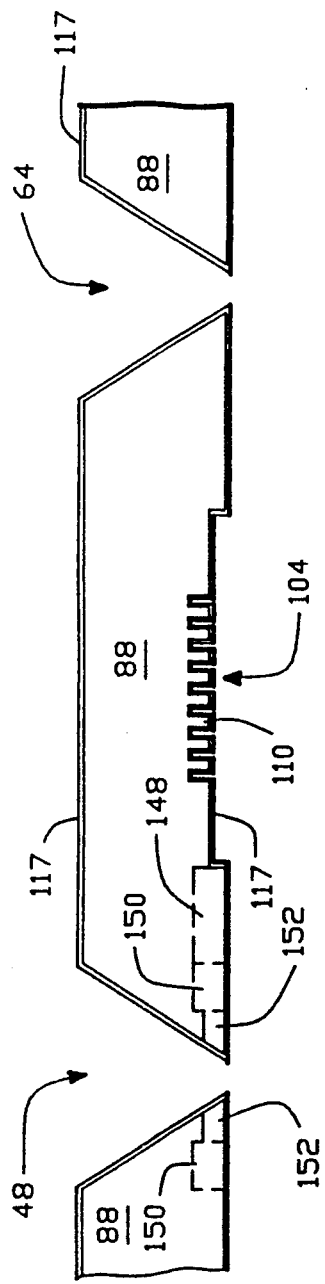
FIGS. 12A to 12C illustrate the final assembly of the first, second and third silicon wafers of FIGS. 9-11.
Figure 12B:
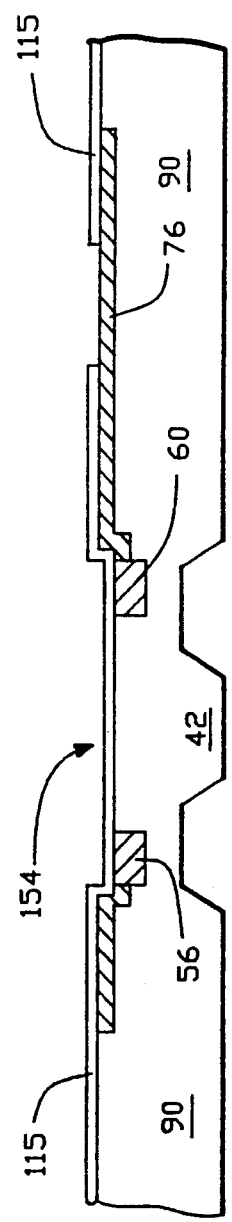
Figure 12C:
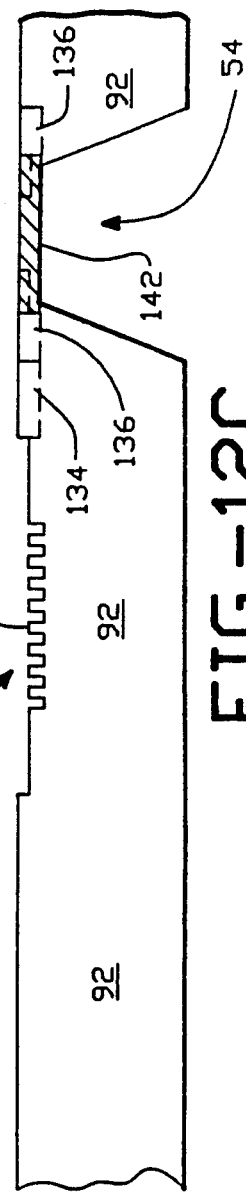

FIG. 12 illustrates the lamination of the three silicon wafers 88, 90, and 92. The three wafers are first made hydrophylic. That is, they are treated with an agent such as hot nitric acid or a hot sulfuric acid and hydrogen peroxide solution or another strong oxidant, which causes water to adhere to them. Then they are carefully aligned. As mentioned above, the three wafers 88, 90 and 92 are [100] oriented wafers. During this alignment step, the three wafers are aligned with each other with respect to crystallographic direction. Furthermore, for example, the electrical feedthrough 64 formed in the first wafer 88 is positioned over the contact hole formed in the oxide layer 115 on the second wafer 90. The three aligned wafers 88, 90, and 92 are placed in an oxidizing atmosphere at a temperature of 400°-1200° C. for approximately one hour. The result is a hermetic seal between the three silicon wafers.

It will be appreciated that when the layers have been laminated together, the second layer 90 serves to enclose the depressions in the first and third layers 88 and 92. Furthermore, as mentioned above, by recessing the first contact surface 98, the performance of the diaphragm 42 is not detrimentally impacted even if the first and second wafers 88 and 90 are slightly misaligned. This is because the recessed first contact surface 98 will not receive unwanted support from the first wafer 88 even if the two layers 88 and 90 are slightly misaligned. Such unwanted support could alter the diaphragm's deflection under stress. The same is true for the second contact surface 100 which is recessed relative to the second stop surface 108.

During the lamination process, the thin heavily doped boron region 140 protects the second feedthrough port 54 and its associated tubular conduits from particulate contamination. Once the three wafers have been laminated together in accordance with the above process, aluminum contacts are evaporated into each of the electrical feedthroughs 64–74.

Next, the laminated wafer assembly is diced. During dicing, sawing fluid and sawn silicon particulates are prevented from entering fluid port 48 by standard dicing tape. Similarly, this fluid and the particulates are prevented from entering fluid port 54 by the thin P+ membrane.

After the laminated wafer assembly has been diced, the heavily doped boron region 140 is removed from the second feedthrough port 54 by a plasma etching process. The plasma etching process is used to avoid fluid contamination of other regions of the sensor 40.

In an alternative method of fabrication, wafers 88 and 92 are first produced as described above. Wafer 90 then is bonded to wafer 92. Most of wafer 90 is removed by grinding and polishing until its thickness is only 10-100 microns. Then the steps discussed above with reference to FIGS. 11A and 11B are performed. Finally, wafer 90 is bonded to wafer 88 to produce a structure such as that illustrated in FIG. 7. This alternative sequence is especially useful when the wafer 90 is to be thinner than about 100 microns.

Therefore, the semiconductor sensor of the invention advantageously provides overpressure protection to a respective thin semiconductor diaphragm by limiting the amount of deflection of the diaphragm using mechanical stop surfaces. The sensor can be manufactured inexpensively, with precision and repeatability using known semiconductor processing techniques. Unwanted adhesion of the diaphragm to the mechanical stop surfaces during operation is prevented by forming upstanding stipple members in either one of these abutting surfaces.

It will be understood that the above-described embodiments are merely illustrative of many possible specific embodiments of the invention. Instead of measuring deflection of the diaphragm using piezoresistors, deflection could be measured using capacitive sensing by forming electrodes on the diaphragm and on an adjacent stop surface in a manner well known in the art.

Figure 13:
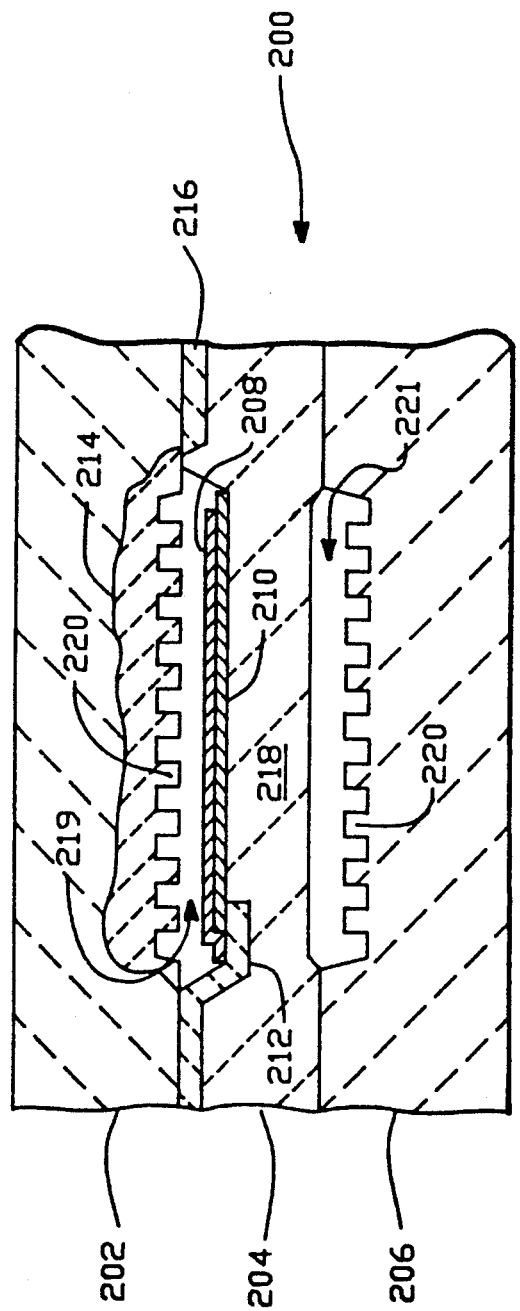
FIG. 13 illustrates a capacitive sensor of an alternative embodiment of the invention.

For example, referring to FIG. 13, there is shown a capacitor 200 of an alternative embodiment of the invention. Wafers 202, 204 and 206 are n-type wafers which are bonded together in a manner which will be understood from the discussion above. The capacitor 200 includes a diaphragm region 218 bounded by gaps 219 and 221 on either side. A capacitor plate 208 is formed from a refractory metal such as tungsten or a refractory silicide such as platinum silicide or any other refractory conductive material. The capacitor plate 208 is formed on top of insulating layer 210 which is formed from $SiO_2$ or $Si_3N_4$ or any suitable insulating material. The capacitor plate 208 is coupled to a first conductive P+ layer 212 formed in wafer 204. The first conductive P+ layer 212 provides electrical contact to an electrical feedthrough (not shown) formed in wafer 202.

A P+ capacitive plate layer 214 formed on wafer 202 acts as the other plate of the capacitor 200. The P+ capacitive plate layer 214 is electrically coupled to a second conductive P+ layer 216 formed in wafer 204. The second conductive P+ layer 216 is coupled to another electrical feedthrough (not shown) formed in wafer 202.

In operation, as the diaphragm region 218 of the capacitor 200 flexes under the application of a differential pressure across its surfaces, the spacing between capacitor plate 208 and P+ capacitor plate layer 214 varies. Since the capacitance varies inversely with distance between capacitor plate 208 and P+ capacitor plate layer 214, the differential pressure can be determined by measuring variations in this capacitance. It will be noted also that in operation, stipples 220 formed in the stop surfaces of wafers 202 and 206 help to prevent the diaphragm region 218 from adhering to either wafer 202 or 206 following an overpressure condition.

Furthermore, for example, instead of forming tubular conduits and a plenum region and vertical filter channels in a first semiconductor wafer, these structural components could be formed in the central second wafer. Furthermore, instead of making the diaphragm-receiving depressions in the first and third wafer deeper than those formed in the second wafer, the depression wherein the diaphragm resides in the second wafer could be made the deepest without departing from the invention. In that case, the distance between contact surfaces and stop surfaces in an assembled sensor still would be made close enough to result in abutting contact before damage to the diaphragm could occur.

Moreover, while the piezoresistors of the illustrated embodiments are junction isolated, dielectrically isolated piezoresistors could be employed as well.

Finally, although the semiconductor is described herein in the context of differential pressure sensing, it will be appreciated that it can be used in other applications as well. For example, those skilled in the art will appreciate how to use the new sensor in acceleration measurement applications and in force measurement applications.

Therefore numerous and varied other arrangements can readily be devised in accordance with the principles of the invention without departing from the spirit and scope of the invention. Thus, the foregoing description is not intended to limit the invention which is defined in the appended claims.

What is claimed is:

1. An electromechanical sensor comprising:
   a first semiconductor wafer including a first stop surface residing in a first shallow recessed region of said first wafer;
   a second semiconductor wafer;
   wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
   means for measuring deflection of said second wafer;
   wherein said second wafer includes a first contact surface residing in a second shallow recessed region of said second wafer;
   wherein said first stop surface and said first contact surface are disposed substantially opposite each other in said first chamber; and
   wherein said second shallow recessed region includes a center section and a thinner perimeter section which substantially surrounds said center section.

2. An electromechanical sensor comprising:
   a first semiconductor wafer including a first stop surface residing in a first shallow recessed region of said first wafer;
   a second semiconductor wafer;
   wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
   means for measuring deflection of said second wafer;
   a first fluid feedthrough port to provide fluid communication with said first chamber;
   wherein said first fluid feedthrough port is disposed in laterally spaced relation to said first chamber;
   wherein said first and second wafers together define at least one tubular conduit extending laterally between said first and second wafers for providing fluid coupling between said first fluid feedthrough port and said first chamber; and means for preventing said first wafer from adhering to said first stop surface.

3. The sensor of claim 2 wherein said means for preventing includes a plurality of upstanding members formed in said first stop surface such that one or more of said plurality of upstanding members abuts against said second wafer when said first stop surface restrains said second wafer.

4. The sensor of claim 2 wherein said means for preventing includes a plurality of upstanding members formed in said second wafer such that one or more of said plurality of upstanding members abuts against said first stop surface when said first stop surface restrains said second wafer.

5. The sensor of claim 3 wherein said upstanding members are spaced apart such that fluid provided to said first port can flow within spaces between upstanding members one or more of said plurality of upstanding members abuts against said second wafer.

6. The sensor of claim 4 wherein said upstanding members are spaced apart such that fluid provided to said first port can flow within spaces between upstanding members one or more of said plurality of upstanding members abuts against said first stop surface.

7. The sensor of claim 3 or 4 wherein said upstanding members are short relative to spacing between said first stop surface and said second wafer.

8. An electromechanical sensor comprising:
a first semiconductor wafer including a first stop surface residing in a first shallow recessed region of said first wafer;
a second semiconductor wafer;
wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
means for measuring deflection of said second wafer;
wherein said means for measuring comprises a plurality of piezoresistive elements formed in said second wafer;
a plurality of respective electrical feedthroughs formed in said first wafer to provide electrical communication between a laminated surface of said first wafer and an unlaminated surface of said first wafer;
means for coupling electrical signals between respective ones of said plurality of feedthroughs and said means for measuring, said means for coupling including a plurality of respective conductive regions formed in a laminated surface of said second wafer; and
a plurality of respective metallized regions, each formed in a different respective electrical feedthroughs such that each respective metallized region is electrically coupled to said means for coupling.

9. An electromechanical sensor comprising:
a first semiconductor wafer including a first stop surface residing in a first shallow recessed region of said first wafer;
a second semiconductor wafer;

wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
means for measuring deflection of said second wafer;
a third semiconductor wafer including a second stop surface residing in a third shallow recessed region of said third wafer;
wherein said second and third semiconductor wafers are laminated together such that said third recessed region of said third wafer and said second wafer define a second chamber in which said second stop surface and said second wafer are disposed close enough together such that said second stop surface restrains said second wafer from deflecting beyond said second stop surface.

10. An electromechanical sensor comprising:
a first silicon wafer including a first stop surface residing in a first shallow recessed region of said first wafer;
a second silicon wafer including a diaphragm including first and second contact surfaces, said diaphragm being suitable to withstand at least a prescribed amount of deflection without sustaining damage;
a third silicon wafer including a second stop surface residing in a second shallow recessed region of said third wafer;
wherein said first, second and third wafers are laminated together with said second wafer sandwiched between said first and third wafers such that said first recessed region and said first contact surface define a first chamber and said second recessed region and said second contact surface define a second chamber;
wherein said first contact surface and said first stop surface are disposed opposite each other in said first chamber and are separated by a predetermined distance selected such that said first contact surface abuts against said first stop surface before said diaphragm reaches said prescribed amount of deflection;
wherein said second contact surface and said second stop surface are disposed opposite each other in said second chamber and are separated by a prescribed distance selected such that said second contact surface abuts against said second stop surface before said diaphragm reaches said prescribed amount of deflection;
means for measuring deflection of said diaphragm;
a first fluid feedthrough port formed in said first wafer to provide fluid communication with said first chamber;
a second fluid feedthrough port formed in said third wafer to provide fluid communication with said second chamber;
first means for preventing said first stop surface and said first contact surface from adhering together; and
second means for preventing said second stop surface and said second contact surface from adhering together.

11. The sensor of claim 10 wherein said first and second contact surfaces reside in respective recessed regions on opposite sides of said diaphragm.

12. The sensor of claim 10 wherein:
said first and second fluid feedthrough ports are respectively disposed in laterally spaced relation to said respective first and second chambers;
said first and second wafers together define at least one first tubular conduit for providing fluid coupling between said first fluid feedthrough port and said first chamber; and
said second and third wafers together define at least one second tubular conduit for providing fluid coupling between said second fluid feedthrough port and said second chamber.

13. The sensor of claim 12 and further comprising:
first means for filtering fluid provided to said at least one first tubular conduit by said first fluid feedthrough port; and
second means for filtering fluid provided to said at least one second tubular conduit by said second fluid feedthrough port.

14. The sensor of claim 13 wherein said diaphragm comprises a center section and thinner, perimeter section which substantially surrounds said center section.

15. The sensor of claim 10 wherein said first and second wafers are bonded directly to one another; and wherein said second and third wafers are bonded directly to one another.

16. An electromechanical sensor comprising:
a first semiconductor wafer including a first stop surface residing in a first shallow recessed region of said first wafer;
a second semiconductor wafer;
wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
wherein said first and second wafers are bonded directly to one another;
a first fluid feedthrough port formed in said first wafer to provide fluid communication with said first chamber, said first fluid feedthrough port being disposed in laterally spaced relation to said first chamber;
at least one tubular conduit extending laterally between said first and second wafers for providing fluid coupling between said first fluid feedthrough port and said first chamber;
means for measuring deflection of said second wafer; and
a plurality of upstanding members formed in said first stop surface such that one or more of said plurality of upstanding members abut against said second wafer when said first stop surface restrains said second wafer.

17. An electromechanical sensor comprising:
a first semiconductor wafer including a first stop surface residing in a first shallow recessed region of said first wafer;
a second semiconductor wafer;
wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface;
wherein said first and second wafers are bonded directly to one another;
a first fluid feedthrough port formed in said first wafer to provide fluid communication with said first chamber, said first fluid feedthrough port being disposed in laterally spaced relation to said first chamber;
at least one tubular conduit extending laterally between said first and second wafers for providing fluid coupling between said first fluid feedthrough port and said first chamber;
means for measuring deflection of said second wafer; and
a plurality of upstanding members formed in said second wafer such that one or more of said plurality of upstanding members abuts against said first stop surface when said first stop surface restrains said second wafer.

18. The sensor of claim 16 or 17 and further comprising:
means for filtering fluid provided to said at least one tubular conduit.

19. The sensor of claims 16 or 17 and further comprising:
means for filtering fluid provided to said at least one first tubular conduit, said means for filtering including a plurality of channels each having narrower lateral dimensions than said at least one first tubular conduit.

20. An electromechanical sensor comprising:
a first semiconductor wafer including a first stop surface residing in a first shallow recessed region of said first wafer;
a second semiconductor wafer;
wherein said first and second semiconductor wafers are laminated together such that said first recessed region of said first wafer and said second wafer define a first chamber in which said first stop surface and said second wafer are disposed close enough together such that said first stop surface restrains said second wafer from deflecting beyond said first stop surface; and
a third semiconductor wafer including a second stop surface residing in a third shallow recessed region of said third wafer;
wherein said second and third semiconductor wafers are laminated together such that said third recessed region of said third wafer and said second wafer define a second chamber in which said second stop surface and said second wafer are disposed close enough together such that said second stop surface retrains said second wafer from deflecting beyond said second stop surface;
means for measuring deflection of said second wafer;
a first fluid feedthrough port to provide fluid communication with said first chamber, said first fluid feedthrough port being disposed in laterally spaced relation to said first chamber;
a second fluid feedthrough port to provide fluid communication with said second chamber, said second fluid feedthrough port being disposed in laterally spaced relation to said second chamber;

at least one first tubular conduit extending laterally between said first and second wafers for providing fluid coupling between said first fluid feedthrough port and said first chamber;

at least one second tubular conduit extending laterally between said second and third wafers for providing fluid coupling between said second fluid feedthrough port and said second chamber.

21. The sensor of claim 20 and further comprising:

a first plurality of upstanding members formed in at least one of, the first stop surface and a portion of said second wafer opposite said first stop surface, for preventing said second wafer from adhering to said first stop surface when said first stop surface restrains said second wafer; and a second plurality of upstanding members formed in at least one of, the second stop surface and a portion of said second wafer opposite said second stop surface, for preventing said second wafer from adhering to said second stop surface when said second stop surface restrains said second wafer.

22. The sensor of claim 20 and further comprising:

first means for filtering fluid provided to said at least one first tubular conduit, said first means for filtering including a plurality of channels each having narrower lateral dimensions than said at least one first tubular conduit; and second filtering means for filtering fluid provided to said at least one second tubular conduit, said means for filtering including a plurality of channels each having narrower lateral dimensions than said at least one second tubular conduit.

23. The sensor of claim 20, 21 or 22 wherein said first and second wafers are bonded directly to one another; and wherein said second and third wafers are bonded directly to one another.

* * * * *